(12) United States Patent
Jung et al.

(10) Patent No.: US 12,019,305 B2
(45) Date of Patent: Jun. 25, 2024

(54) OPTICAL IMAGING SYSTEM

(71) Applicant: Samsung Electro-Mechanics Co., Ltd., Suwon-si (KR)

(72) Inventors: Phil Ho Jung, Suwon-si (KR); Jae Hyuk Huh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 127 days.

(21) Appl. No.: 17/246,835

(22) Filed: May 3, 2021

(65) Prior Publication Data

US 2021/0263267 A1 Aug. 26, 2021

Related U.S. Application Data

(63) Continuation of application No. 16/136,388, filed on Sep. 20, 2018, now Pat. No. 11,029,489.

(30) Foreign Application Priority Data

Jan. 8, 2018 (KR) .................. 10-2018-0002403

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
None
See application file for complete search history.

(56) References Cited

U.S. PATENT DOCUMENTS

| 9,726,857 | B2 | 8/2017 | Chen |
| 9,733,453 | B2 | 8/2017 | Tsai et al. |
| 11,789,234 | B2 * | 10/2023 | Fukaya .................. G02B 9/62 |
| | | | 359/752 |
| 2013/0342918 | A1 | 12/2013 | Kubota et al. |
| 2014/0092491 | A1 | 4/2014 | Hsu et al. |
| 2014/0327808 | A1 | 11/2014 | Chen et al. |
| 2015/0070579 | A1 | 3/2015 | Chen et al. |
| 2015/0253546 | A1 | 9/2015 | Sun |
| 2016/0187621 | A1 | 6/2016 | Chen |
| 2016/0195702 | A1 * | 7/2016 | Lee ......................... G02B 9/62 |
| | | | 359/713 |

(Continued)

FOREIGN PATENT DOCUMENTS

| CN | 105511061 A | 4/2016 |
| CN | 106896472 A | 6/2017 |

(Continued)

OTHER PUBLICATIONS

Chinese Office Action dated Jun. 23, 2021 issued in counterpart Chinese Patent Application No. 201811405616.1 (7 pages in English and 7 pages in Chinese).

(Continued)

*Primary Examiner* — Darryl J Collins
(74) *Attorney, Agent, or Firm* — NSIP Law

(57) ABSTRACT

An optical imaging system includes a first lens, a second lens, a third lens, a fourth lens, a fifth lens, and a sixth lens sequentially arranged from an object side. At least two of the first lens, the second lens, the third lens, the fourth lens, the fifth lens, and the sixth lens include at least one inflection point. An object-side surface of the sixth lens is concave.

16 Claims, 6 Drawing Sheets

(56) References Cited

U.S. PATENT DOCUMENTS

| | | | |
|---|---|---|---|
| 2016/0306140 A1* | 10/2016 | Chen | G02B 13/18 |
| 2017/0123187 A1 | 5/2017 | Heu et al. | |
| 2017/0219803 A1 | 8/2017 | Lee et al. | |
| 2017/0235102 A1 | 8/2017 | Lai et al. | |
| 2017/0248770 A1* | 8/2017 | Chen | G02B 9/62 |
| 2018/0045913 A1* | 2/2018 | Hsueh | G02B 13/0045 |
| 2018/0172955 A1 | 6/2018 | Bone et al. | |
| 2018/0203208 A1* | 7/2018 | Hsueh | G02B 13/06 |
| 2019/0033556 A1* | 1/2019 | Tang | G02B 9/62 |
| 2019/0129143 A1 | 5/2019 | Teraoka et al. | |

FOREIGN PATENT DOCUMENTS

| | | |
|---|---|---|
| KR | 10-2017-0090172 A | 8/2017 |
| KR | 10-2017-0108669 A | 9/2017 |
| TW | 201624040 A | 7/2016 |

OTHER PUBLICATIONS

Chinese Office Action issued on Nov. 3, 2020 in counterpart Chinese Patent Application No. 201811405616.1 (6 pages in English and 6 pages in Chinese).

Korean Office Action issued on Jun. 26, 2023, in counterpart Korean Patent Application No. 10-2018-0002403 (7 pages in English, 5 pages in Korean).

Korean Office Action issued on Jan. 15, 2024, in counterpart Korean Patent Application No. 10-2023-0171394 (5 pages in English, 4 pages in Korean).

* cited by examiner

OPTICAL IMAGING SYSTEM

CROSS-REFERENCE TO RELATED APPLICATION

This application is a Continuation Application of U.S. patent application Ser. No. 16/136,388, filed on Sep. 20, 2018, now U.S. Pat. No. 11,029,489, issued on Jun. 8, 2021, which claims the benefit under 35 USC 119(a) of Korean Patent Application No. 10-2018-0002403 filed on Jan. 8, 2018, in the Korean Intellectual Property Office, the entire disclosure of which is incorporated herein by reference for all purposes.

BACKGROUND

1. Field

This application relates to an optical imaging system including six lenses.

2. Description of the Background

Small camera modules may be mounted in mobile communications terminals. For example, small camera modules may be mounted in thinned devices, such as mobile phones, or the like. Such a small camera module includes an optical imaging system including a small number of lenses so that it may be made as thin as possible. For example, the optical imaging system of the small camera module includes four or less lenses.

However, such an optical imaging system has a high f-number (F No.), such that it is difficult for the optical imaging system to be used in a small camera module while still providing high performance.

The above information is provided as background information only to assist with an understanding of the present disclosure. No determination has been made, and assertion is made, as to whether any of the above might be applicable as prior art with regard to the disclosure.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An optical imaging system includes a first lens, a second lens, a third lens, a fourth lens, a fifth lens, and a sixth lens sequentially arranged from an object side. At least two of the first lens, the second lens, the third lens, the fourth lens, the fifth lens, and the sixth lens include at least one inflection point. An object-side surface of the sixth lens is concave.

One of an object-side surface and an image-side surface of the fourth lens may include an inflection point.

One of an object-side surface or an image-side surface of the fifth lens may include an inflection point.

One of the object-side surface or an image-side surface of the sixth lens may include an inflection point.

The second lens may have a refractive index greater than a refractive index of the first lens, a refractive index of the third lens, a refractive index of the fourth lens, a refractive index of the fifth lens, and a refractive index of the sixth lens.

The fourth lens may have a refractive index less than a refractive index of the second lens and greater than a refractive index of the first lens, a refractive index of the third lens, a refractive index of the fifth lens, and a refractive index of the sixth lens.

The first lens may have positive refractive power.

The sixth lens may have negative refractive power.

An object-side surface of the fifth lens may be convex.

An f-number of the optical imaging system may be less than 2.

An optical imaging system includes a first lens, a second lens, a third lens, a fourth lens, a fifth lens, and a sixth lens sequentially arranged from an object side. One of an image-side surface of the first lens and an image-side surface of the third lens is concave. One of an object-side surface of the fourth lens and an image-side surface of the fourth lens includes an inflection point. One of an object-side surface of the fifth lens and an image-side surface of the fifth lens includes an inflection point. One of an object-side surface of the sixth lens and an image-side surface of the sixth lens includes an inflection point. V4 is an Abbe number of the fourth lens, V5 is an Abbe number of the fifth lens, and V5-V4 is greater than 20 and less than 40.

The second lens may have a refractive index of 1.65 or higher.

The fourth lens may have a refractive index of 1.6 or higher.

OAL is a distance from an object-side surface of the first lens to an imaging plane, FOV is a field of view of the optical imaging system, and OAL/FOV may be greater than 0.05 and less than 0.2.

An object-side surface of the fifth lens may be convex.

An object-side surface of the sixth lens may be concave.

An optical imaging system includes a first lens, a second lens, a third lens, a fourth lens, a fifth lens, and a sixth lens sequentially arranged from an object side. At least one of the fourth lens, the fifth lends, and the sixth lens includes at least one inflection point on both an object-side surface and an image-side surface thereof. The second lens has a refractive index that is higher than a refractive index of each of the first lens, the third lens, the fourth lens, the fifth lens, and the sixth lens.

At least two of the fourth lens, the fifth lends, and the sixth lens may include at least one inflection point on both an object-side surface and an image-side surface thereof.

Each of the fourth lens, the fifth lends, and the sixth lens may include at least one inflection point on both an object-side surface and an image-side surface thereof.

DETAILED DESCRIPTION

Figure 1:
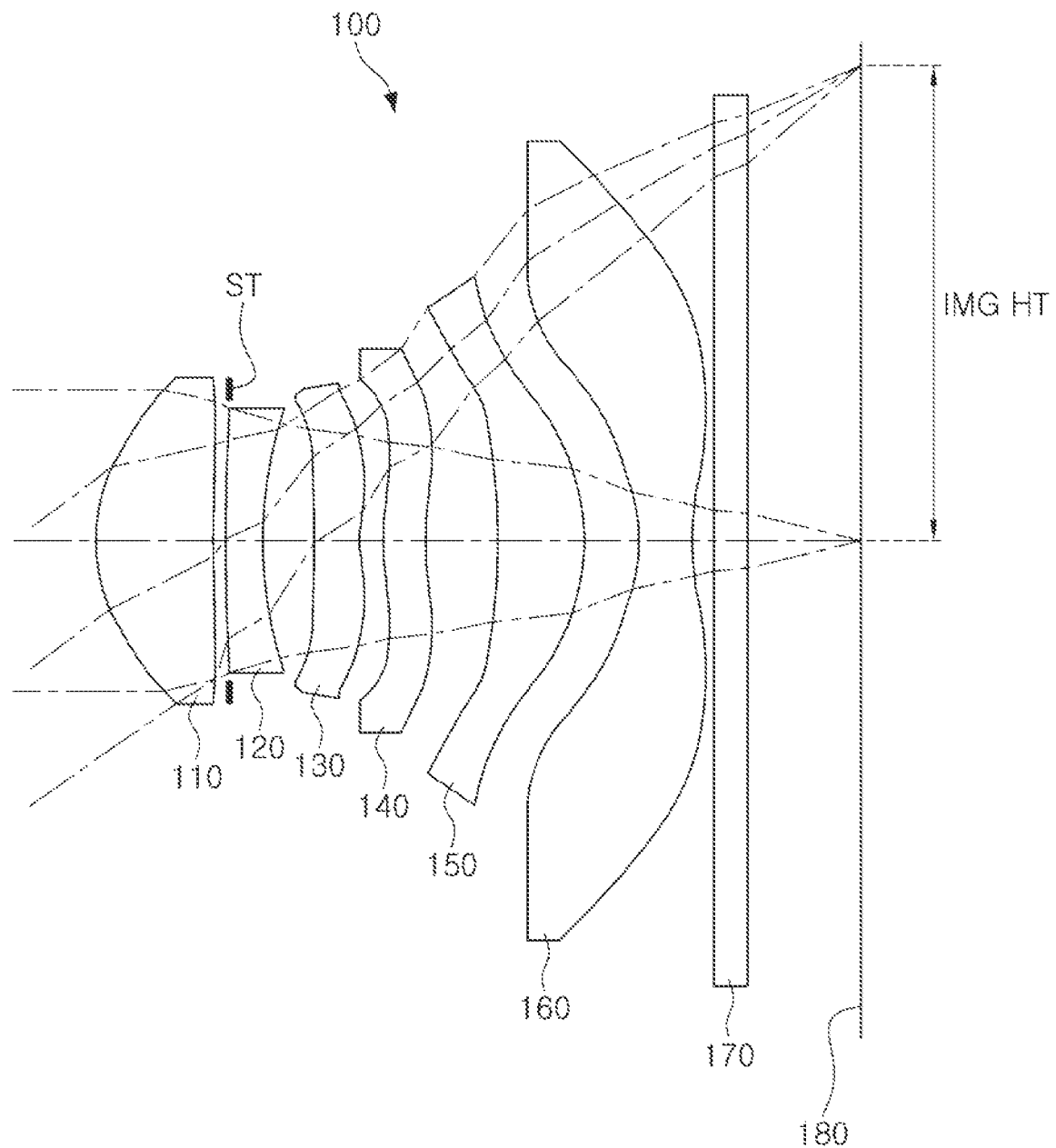
FIG. 1 is a view illustrating an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

Although terms such as "first," "second," and "third" may be used herein to describe various lenses, members, components, or sections, these lenses, members, components, or sections are not to be limited by these terms. Rather, these terms are only used to distinguish one member, component, region, layer, or section from another member, component, region, layer, or section.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

As described herein, a first lens refers to a lens closest to an object (or a subject), while a sixth lens refers to a lens closest to an imaging plane (or an image sensor). In addition, all of radii of curvature and thicknesses of lenses, a distance from the object-side surface of the first lens to the imaging plane (OAL), an IMG HT (½ of a diagonal length of the imaging plane), and focal lengths are represented by millimeters (mm). Further, thicknesses of the lenses, gaps between the lenses, and the OAL are distances measured based on optical axes of the lenses. Further, in a description for shapes of the lenses, the meaning that one surface of a lens is convex is that an optical axis portion of a corresponding surface is convex, and the meaning that one surface of a lens is concave is that an optical axis portion of a corresponding surface is concave. Therefore, although it is described that one surface of a lens is convex, an edge portion of the lens may be concave. Likewise, although it is described that one surface of a lens is concave, an edge portion of the lens may be convex.

An optical imaging system may include six lenses sequentially arranged from an object side toward the imaging plane. For example, the optical imaging system may include a first lens, a second lens, a third lens, a fourth lens, a fifth lens, and a sixth lens that are sequentially arranged. The first to sixth lenses may be arranged with a predetermined interval therebetween. For example, a predetermined interval may be formed between an image-side surface of the first lens and an object-side surface of the second lens.

The first lens may have refractive power. For example, the first lens may have positive refractive power.

One surface of the first lens may be convex. For example, an object-side surface of the first lens may be convex. The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The first lens may have a predetermined refractive index. For example, the refractive index of the first lens may be less than 1.6. The first lens may have a predetermined Abbe number. For example, the Abbe number of the first lens may be 50 or more.

The second lens may have refractive power. For example, the second lens may have negative refractive power.

One surface of the second lens may be convex. For example, an object-side surface of the second lens may be convex. The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass.

The second lens may have a refractive index higher than those of one or more of the other lenses of the optical imaging system. For example, the refractive index of the second lens may be 1.65 or more. The second lens may have a predetermined Abbe number. For example, the Abbe number of the second lens may be less than 22.

The third lens may have refractive power. For example, the third lens may have positive or negative refractive power.

One surface of the third lens may be convex. For example, an object-side surface of the third lens may be convex. The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The third lens may have a refractive index that is relatively similar to that of the first lens. For example, the refractive index of the third lens may be less than 1.6. The third lens may have an Abbe number similar to that of the first lens. For example, the Abbe number of the third lens may be 50 or more.

The fourth lens may have refractive power. For example, the fourth lens may have positive or negative refractive power.

One surface of the fourth lens may be convex. For example, an object-side surface of the fourth lens may be convex. The fourth lens may have an aspherical surface. For example, both surfaces of the fourth lens may be aspherical. The fourth lens may have one or more inflection points. For example, one or more inflection points may be formed on the object-side surface or an image-side surface of the fourth lens.

The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may have a refractive index lower than that of the second lens and higher than those of one or more of the other lenses of the optical imaging system. For example, the refractive index of the fourth lens may be 1.6 or more. The fourth lens may have an Abbe number lower than that of the first lens. For example, the Abbe number of the fourth lens may be less than 30.

The fifth lens may have refractive power. For example, the fifth lens may have positive refractive power.

One surface of the fifth lens may be convex. For example, an image-side surface of the fifth lens may be convex. The fifth lens may have an aspherical surface. For example, both surfaces of the fifth lens may be aspherical. The fifth lens may have one or more inflection points. For example, one or more inflection points may be formed on an object-side surface or the image-side surface of the fifth lens.

The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may have a refractive index that is relatively similar to that of the first lens. For example, the refractive index of the fifth lens may be less than 1.6. The fifth lens may have a predetermined Abbe number. For example, the Abbe number of the fifth lens may be 50 or more.

The sixth lens may have refractive power. For example, the sixth lens may have negative refractive power.

One surface of the sixth lens may be concave. For example, an object-side surface of the sixth lens may be concave. The sixth lens may have one or more inflection points. For example, one or more inflection points may be formed on both surfaces of the sixth lens. The sixth lens may have an aspherical surface. For example, both surfaces of the sixth lens may be aspherical.

The sixth lens may be formed of a material having high light transmissivity and excellent workability. For example, the sixth lens may be formed of plastic. However, a material of the sixth lens is not limited to plastic. For example, the sixth lens may be formed of glass.

The sixth lens may have a refractive index that is relatively similar to that of the first lens. For example, the refractive index of the sixth lens may be less than 1.6. The sixth lens may have a predetermined Abbe number. For example, the Abbe number of the sixth lens may be 50 or more.

The first to sixth lenses may have an aspherical shape, as described above. For example, at least one surface of all of the first to sixth lenses may be aspherical. Here, an aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}. \quad \text{Equation 1}$$

In equation 1, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance r and a tangential plane meeting the apex of the aspherical surface of the lens.

The optical imaging system may further include a stop. The stop may be disposed between the first lens and the second lens.

The optical imaging system may further include a filter. The filter may block a partial wavelength from incident light incident through the first to sixth lenses. For example, the filter may block an infrared wavelength of the incident light.

The optical imaging system may further include an image sensor. The image sensor may provide the imaging plane on which light refracted by the lenses may be imaged. For example, a surface of the image sensor may form the imaging plane. The image sensor may be configured to implement a high level of resolution.

The optical imaging system may satisfy one or more of the following Conditional Expressions 1 to 4:

| Conditional Expression 1 | −0.7 < f1/f2 |
| Conditional Expression 2 | 20 < V5 − V4 < 40 |
| Conditional Expression 3 | 0.05 < OAL/FOV < 0.2 |
| Conditional Expression 4 | 0.2 < Th6/Th5 < 0.9. |

In addition, the optical imaging system may satisfy one or more of the following Conditional Expressions 5 and 6:

| Conditional Expression 5 | 0.05 < OAL/FOV < 0.07 |
| Conditional Expression 6 | 0.2 < Th6/Th5 < 0.6. |

In the above Conditional Expressions 1-6, f1 is a focal length of the first lens, f2 is a focal length of the second lens, V4 is an Abbe number of the fourth lens, V5 is an Abbe number of the fifth lens, OAL is a distance from the object-side surface of the first lens to the imaging plane, FOV is a field of view of the optical imaging system, Th5 is a thickness (in an optical axis portion) of the fifth lens, and Th6 is a thickness (in an optical axis portion) of the sixth lens.

Next, optical imaging systems according to several examples will be described.

First, an optical imaging system according to a first example will be described with reference to FIG. 1.

The optical imaging system 100 in the first example may include a plurality of lenses having refractive power. For example, the optical imaging system 100 may include a first lens 110, a second lens 120, a third lens 130, a fourth lens 140, a fifth lens 150, and a sixth lens 160.

The first lens 110 may have positive refractive power, and an object-side surface thereof may be convex and an image-side surface thereof may be concave.

The second lens 120 may have negative refractive power, and an object-side surface thereof may be convex and an image-side surface thereof may be concave.

The third lens 130 may have negative refractive power, and an object-side surface thereof may be convex and an image-side surface thereof may be concave.

The fourth lens 140 may have positive refractive power, and an object-side surface thereof may be convex and an image-side surface thereof may be concave. In addition, inflection points may be formed on the object-side surface and the image-side surface of the fourth lens 140. For example, the object-side surface of the fourth lens 140 may be convex in a paraxial region and be concave in an area near the paraxial region, and the image-side surface thereof may be concave in a paraxial region and be convex in an area near the paraxial region.

The fifth lens 150 may have positive refractive power, and an object-side surface thereof may be concave and an image-side surface thereof may be convex. In addition, inflection points may be formed on the object-side surface and the image-side surface of the fifth lens 150.

The sixth lens 160 may have negative refractive power, and an object-side surface thereof may be concave and an image-side surface thereof may be concave. In addition, inflection points may be formed on both surfaces of the sixth lens 160. For example, the object-side surface of the sixth lens 160 may be convex in a paraxial region and be concave in an area near the paraxial region, and the image-side surface thereof may be concave in a paraxial region and be convex in an area near the paraxial region.

The second lens 120 and the fourth lens 140 may have relatively high refractive indices. The second lens 120 may have the highest refractive index among the lenses in the optical imaging system 100, and the fourth lens 140 may have the second highest refractive index among the lenses in the optical imaging system 100. The refractive index of the second lens 120 may be 1.66 or more, and the refractive index of the fourth lens 140 may be 1.6 or more. The first lens 110, the third lens 130, the fifth lens 150, and the sixth lens 160 may each have relatively low refractive indices. The refractive indices of the first lens 110, the third lens 130, the fifth lens 150, and the sixth lens 160 may each be 1.56 or less.

The second lens 120 and the fourth lens 140 may have relatively low Abbe numbers. The Abbe numbers of the second lens 120 and the fourth lens 140 may each be 25 or less. The first lens 110, the third lens 130, the fifth lens 150, and the sixth lens 160 may each have relatively high Abbe numbers. The Abbe numbers of the first lens 110, the third lens 130, the fifth lens 150, and the sixth lens 160 may each be 52 or more.

The optical imaging system 100 may include a stop ST. For example, the stop ST may be disposed between the first lens 110 and the second lens 120. The stop ST may control an amount of light incident to an imaging plane 180.

The optical imaging system 100 may include a filter 170. For example, the filter 170 may be disposed between the sixth lens 160 and the imaging plane 180. The filter 170 may block an infrared ray incident to the imaging plane 180.

The optical imaging system 100 may include an image sensor. The image sensor may provide the imaging plane 180 on which light refracted through the lenses is imaged. The image sensor may convert an optical signal imaged on the imaging plane 180 into an electrical signal.

The optical imaging system 100 may have a low F No. The F No. of the optical imaging system in the first example 100 may be 1.85.

Figure 2:
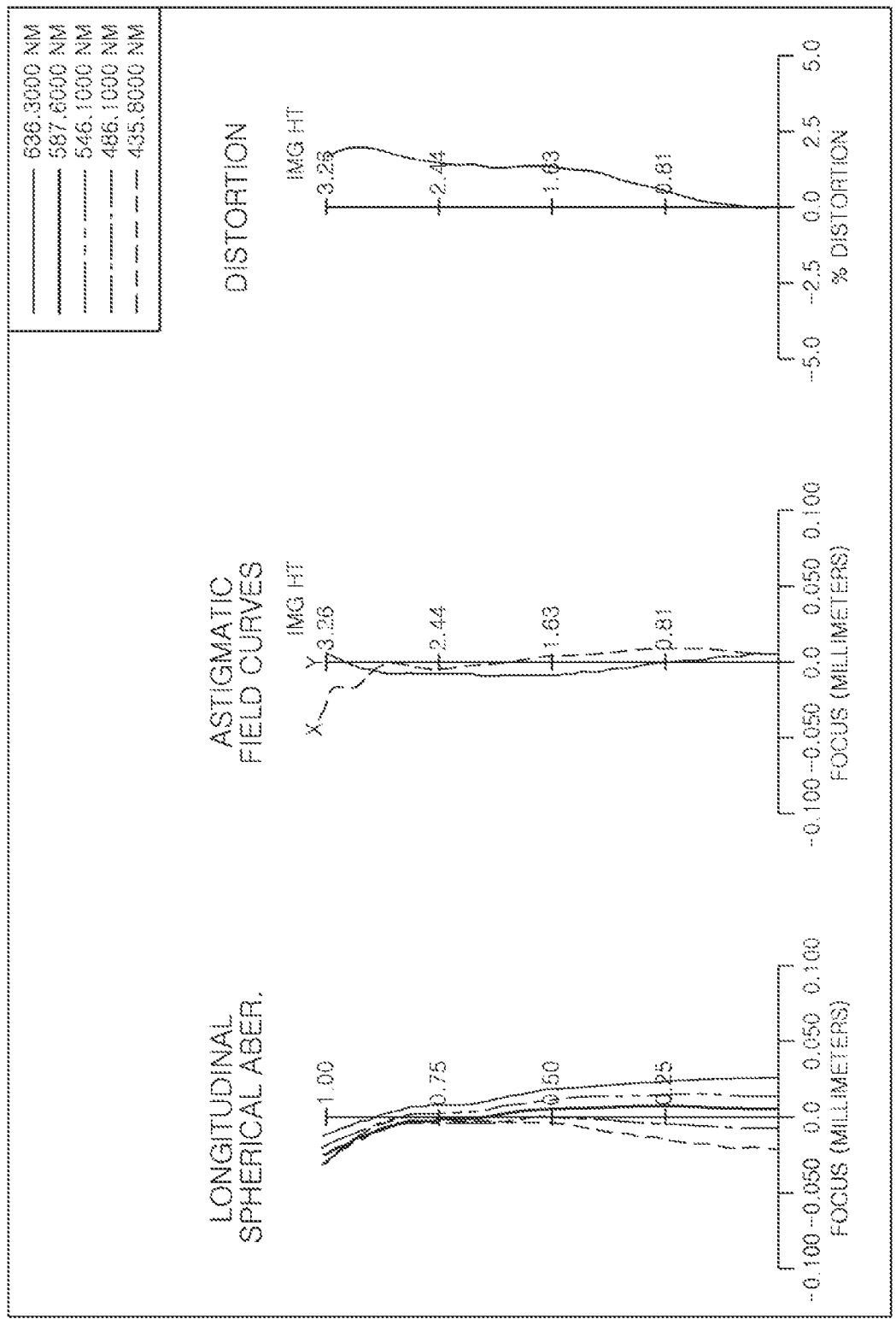
FIG. 2 illustrates graphs having curves representing aberration characteristics of the optical imaging system illustrated in FIG. 1.

The optical imaging system in the first example 100 may represent aberration characteristics as illustrated in FIG. 2. Table 1 represents characteristics of lenses of the optical imaging system in the first example 100, and Table 2 represents aspherical characteristics of the optical imaging system in the first example 100.

TABLE 1

First Example
f = 3.93  F No. = 1.85  FOV = 78.4  OAL = 4.600

| Surface No. | | Radius of Curvature | Thickness/ Distance | Refractive Index | Abbe Number | Focal Length |
|---|---|---|---|---|---|---|
| S1 | First Lens | 1.5228 | 0.6858 | 1.544 | 56.100 | 3.297 |
| S2 | | 8.2704 | 0.0801 | | | |
| S3 | Second Lens | 14.4630 | 0.2200 | 1.660 | 20.350 | −7.520 |
| S4 | | 3.7084 | 0.3011 | | | |
| S5 | Third Lens | 15.0000 | 0.2946 | 1.544 | 56.100 | −34.731 |
| S6 | | 8.3204 | 0.1420 | | | |
| S7 | Fourth Lens | 2.8245 | 0.2503 | 1.640 | 23.500 | 26.054 |
| S8 | | 3.2759 | 0.4152 | | | |
| S9 | Fifth Lens | −22.7673 | 0.5714 | 1.544 | 56.100 | 2.101 |
| S10 | | −1.1030 | 0.2841 | | | |
| S11 | Sixth Lens | −1.6069 | 0.3300 | 1.544 | 56.100 | −1.732 |
| S12 | | 2.4692 | 0.1345 | | | |
| S13 | Filter | Infinity | 0.2100 | 1.517 | 64.200 | |
| S14 | | Infinity | 0.6810 | | | |
| S15 | Imaging Plane | infinity | | | | |

TABLE 2

| First Exemplary Embodiment | S1 | S2 | S3 | S4 | S5 | S6 | S7 |
|---|---|---|---|---|---|---|---|
| K | −1.11493 | −23.70901 | 25.51264 | 6.69361 | 0.00000 | 0.00000 | −28.60705 |
| A | 0.035445 | −0.084093 | −0.121231 | −0.065598 | −0.099439 | −0.262113 | −0.228315 |
| B | 0.029814 | 0.141397 | 0.299695 | 0.223732 | 0.133726 | 0.735503 | 0.266229 |
| C | −0.102629 | −0.272213 | −0.622868 | −0.501495 | −0.597395 | −2.360882 | −0.453950 |
| D | 0.284836 | 0.585064 | 1.790576 | 1.479639 | 1.212968 | 5.381433 | 0.607804 |
| E | −0.474983 | −0.998765 | −4.046274 | −3.464256 | −2.223379 | −8.728256 | −0.664888 |
| F | 0.454058 | 1.011072 | 5.475196 | 4.967442 | 3.274299 | 8.995004 | 0.473682 |
| G | −0.231752 | −0.543383 | −3.913831 | −3.824447 | −3.169047 | −5.271134 | −0.212232 |
| H | 0.046349 | 0.119779 | 1.148347 | 1.237336 | 1.333981 | 1.340995 | 0.047636 |
| J | 0 | 0 | 0 | 0 | 0 | 0 | 0 |

| First Exemplary Embodiment | S8 | S9 | S10 | S11 | S12 |
|---|---|---|---|---|---|
| K | −17.83478 | −64.15173 | −1.38611 | −8.10335 | −6.56149 |
| A | −0.199626 | −0.047115 | 0.208547 | −0.022827 | −0.133569 |
| B | 0.138156 | 0.077066 | −0.231460 | −0.174659 | 0.066479 |
| C | −0.154481 | −0.282510 | 0.114064 | 0.186177 | −0.027667 |
| D | 0.162165 | 0.400297 | −0.007388 | −0.083562 | 0.008713 |
| E | −0.155989 | −0.325101 | −0.011143 | 0.020700 | −0.002004 |
| F | 0.099397 | 0.149132 | 0.003530 | −0.002969 | 0.000304 |

TABLE 2-continued

| | | | | | |
|---|---|---|---|---|---|
| G | −0.031726 | −0.034944 | −0.000369 | 0.000232 | −0.000026 |
| H | 0.003895 | 0.003240 | 0.000010 | −0.000008 | 0.000001 |
| J | 0 | 0 | 0 | 0 | 0 |

Figure 3:
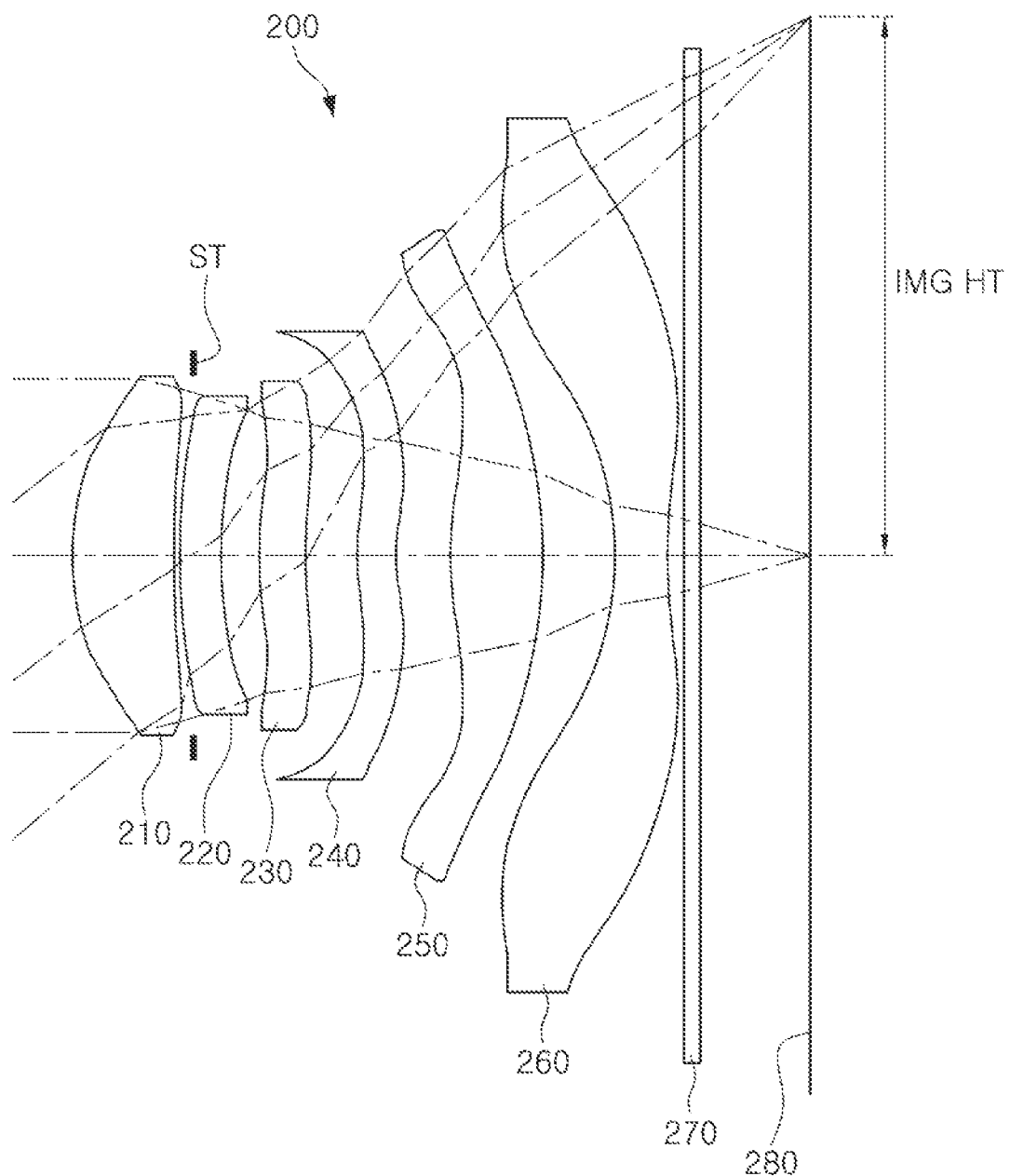
FIG. 3 is a view illustrating an example of an optical imaging system.

A second example of an optical imaging system will be described with reference to FIG. 3.

The optical imaging system 200 in the second example may include a plurality of lenses having refractive power. For example, the optical imaging system 200 may include a first lens 210, a second lens 220, a third lens 230, a fourth lens 240, a fifth lens 250, and a sixth lens 260.

The first lens 210 may have positive refractive power, and an object-side surface thereof may be convex and an image-side surface thereof may be concave.

The second lens 220 may have negative refractive power, and an object-side surface thereof may be convex and an image-side surface thereof may be concave.

The third lens 230 may have positive refractive power, and an object-side surface thereof may be convex and an image-side surface thereof may be concave.

The fourth lens 240 may have negative refractive power, and an object-side surface thereof may be convex and an image-side surface thereof may be concave. In addition, inflection points may be formed on the object-side surface and the image-side surface of the fourth lens 240. For example, the object-side surface of the fourth lens 240 may be convex in a paraxial region and be concave in an area near the paraxial region, and the image-side surface thereof may be concave in a paraxial region and be convex in an area near the paraxial region.

The fifth lens 250 may have positive refractive power, and an object-side surface thereof may be convex and an image-side surface thereof may be convex. In addition, inflection points may be formed on the object-side surface and the image-side surface of the fifth lens 250.

The sixth lens 260 may have negative refractive power, and an object-side surface thereof may be concave and an image-side surface thereof may be concave. In addition, inflection points may be formed on both surfaces of the sixth lens 260. For example, the object-side surface of the sixth lens 260 may be convex in a paraxial region and be concave in an area near the paraxial region, and the image-side surface thereof may be concave in a paraxial region and be convex in an area near the paraxial region.

The second lens 220 and the fourth lens 240 may have relatively high refractive indices. The second lens 220 may have the highest refractive index among the lenses in the optical imaging system 200, and the fourth lens 240 may have the second highest refractive index among the lenses in the optical imaging system 200. The refractive index of the second lens 220 may be 1.66 or more, and the refractive index of the fourth lens 240 may be 1.6 or more. The first lens 210, the third lens 230, the fifth lens 250, and the sixth lens 260 may each have relatively low refractive indices. The refractive indices of the first lens 210, the third lens 230, the fifth lens 250, and the sixth lens 260 may each be 1.56 or less.

The second lens 220 and the fourth lens 240 may have relatively low Abbe numbers. The Abbe numbers of the second lens 220 and the fourth lens 240 may each be 25 or less. The first lens 210, the third lens 230, the fifth lens 250, and the sixth lens 260 may each have relatively high Abbe numbers. The Abbe numbers of the first lens 210, the third lens 230, the fifth lens 250, and the sixth lens 260 may each be 52 or more.

The optical imaging system 200 may include a stop ST. For example, the stop ST may be disposed between the first lens 210 and the second lens 220. The stop ST may control an amount of light incident to an imaging plane 280.

The optical imaging system 200 may include a filter 270. For example, the filter 270 may be disposed between the sixth lens 260 and the imaging plane 280. The filter 270 may block an infrared ray incident to the imaging plane 280.

The optical imaging system 200 may include an image sensor. The image sensor may provide the imaging plane 280 on which light refracted through the lenses is imaged. The image sensor may convert an optical signal imaged on the imaging plane 280 into an electrical signal.

The optical imaging system 200 may have a low F No. The F No. of the optical imaging system in the second example 200 may be 1.70.

Figure 4:
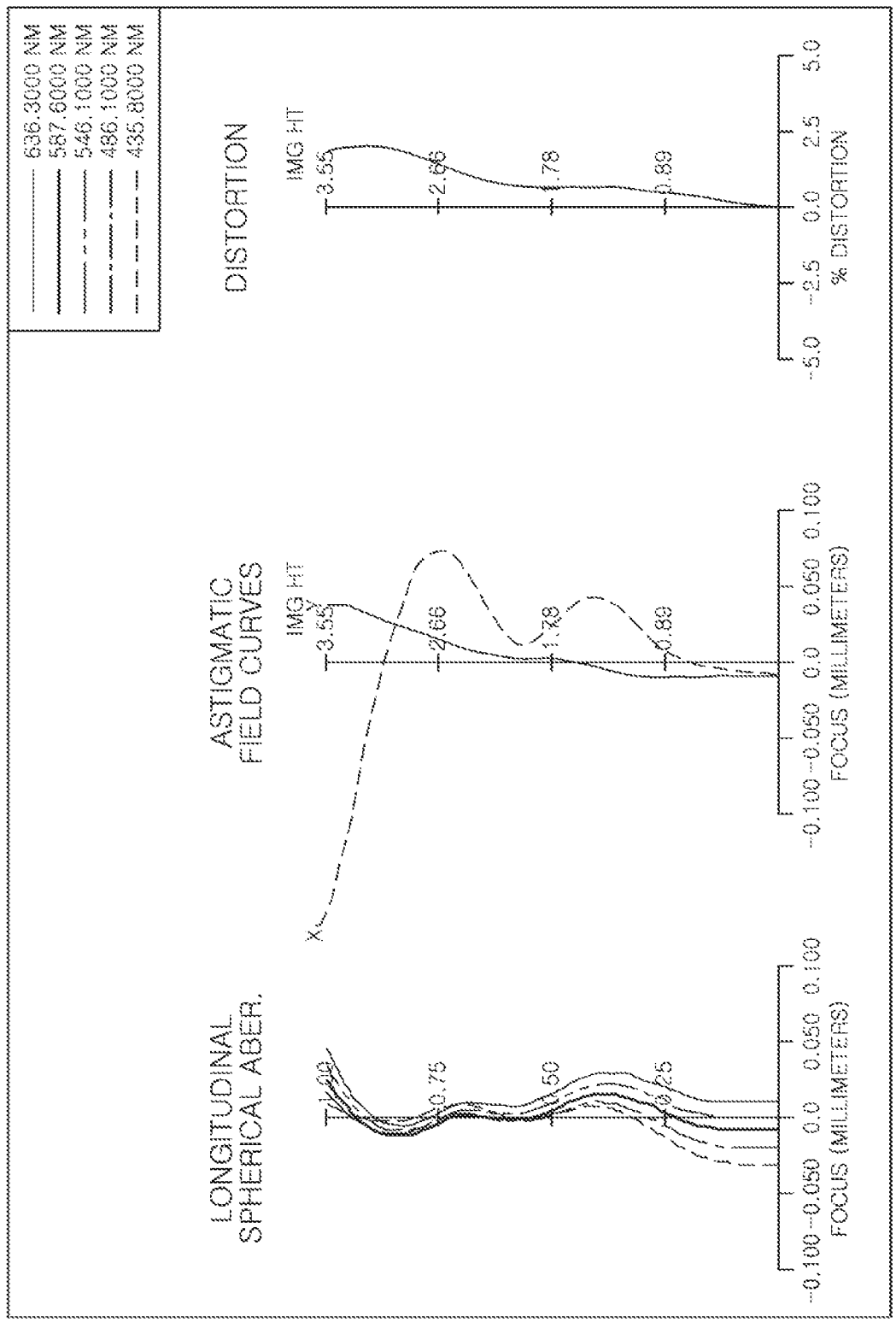
FIG. 4 illustrates graphs having curves representing aberration characteristics of the optical imaging system illustrated in FIG. 3.

The optical imaging system in the second example 200 may represent aberration characteristics as illustrated in FIG. 4. Table 3 represents characteristics of lenses of the optical imaging system 200, and Table 4 represents aspherical characteristics of the optical imaging system in the second example 200.

TABLE 3

Second Example
f = 4.24 F No. = 1.70 FOV = 78.8 OAL = 4.896

| Surface No. | | Radius of Curvature | Thickness/ Distance | Refractive Index | Abbe Number | Focal Length |
|---|---|---|---|---|---|---|
| S1 | First Lens | 1.6600 | 0.6950 | 1.544 | 56.100 | 4.098 |
| S2 | | 5.4642 | 0.0841 | | | |
| S3 | Second Lens | 6.5122 | 0.2200 | 1.660 | 20.350 | −9.541 |
| S4 | | 3.1791 | 0.2742 | | | |
| S5 | Third Lens | 4.4871 | 0.2980 | 1.544 | 56.100 | 43.466 |
| S6 | | 5.4023 | 0.3442 | | | |
| S7 | Fourth Lens | 3.3372 | 0.2500 | 1.640 | 23.500 | −33.840 |
| S8 | | 2.8101 | 0.3775 | | | |
| S9 | Fifth Lens | 6.0280 | 0.5732 | 1.544 | 56.100 | 2.882 |
| S10 | | −2.0605 | 0.5044 | | | |
| S11 | Sixth Lens | −2.1547 | 0.3400 | 1.535 | 55.700 | −2.437 |
| S12 | | 3.5116 | 0.1000 | | | |

TABLE 3-continued

Second Example
f = 4.24 F No. = 1.70 FOV = 78.8 OAL = 4.896

| Surface No. | | Radius of Curvature | Thickness/ Distance | Refractive Index | Abbe Number | Focal Length |
|---|---|---|---|---|---|---|
| S13 | Filter | Infinity | 0.1100 | 1.517 | 64.200 | |
| S14 | | Infinity | 0.7250 | | | |
| S15 | Imaging Plane | infinity | | | | |

TABLE 4

| Second Exemplary Embodiment | S1 | S2 | S3 | S4 | S5 | S6 | S7 |
|---|---|---|---|---|---|---|---|
| K | −1.25646 | −23.81437 | 23.93321 | 3.89759 | 0.00000 | 0.00000 | −29.97367 |
| A | 0.031294 | −0.094924 | −0.165237 | −0.112865 | −0.105932 | −0.099682 | −0.221376 |
| B | −0.014628 | 0.163252 | 0.267358 | 0.369956 | −0.091851 | −0.120314 | 0.128916 |
| C | 0.126883 | −0.289000 | −0.220232 | −1.092286 | 1.329919 | 1.027016 | 0.190309 |
| D | −0.361113 | 0.436251 | −0.014969 | 2.990808 | −5.491154 | −3.071940 | −0.778391 |
| E | 0.538167 | −0.534023 | 0.260344 | −5.514483 | 11.217468 | 4.724795 | 1.102189 |
| F | −0.446140 | 0.430597 | −0.288769 | 6.091503 | −12.601729 | −4.078659 | −0.819680 |
| G | 0.191263 | −0.189322 | 0.163725 | −3.592907 | 7.404120 | 1.862348 | 0.309763 |
| H | −0.033546 | 0.033293 | −0.042062 | 0.872804 | −1.767660 | −0.345792 | −0.046230 |
| J | 0 | 0 | 0 | 0 | 0 | 0 | 0 |

| Second Exemplary Embodiment | S8 | S9 | S10 | S11 | S12 |
|---|---|---|---|---|---|
| K | −19.77599 | −72.14303 | −1.15918 | −7.02665 | −3.41770 |
| A | −0.243209 | 0.035310 | 0.125112 | −0.094610 | 0.124420 |
| B | 0.223595 | −0.083987 | −0.105313 | −0.010208 | 0.056137 |
| C | −0.227966 | 0.089551 | 0.108087 | 0.040727 | −0.022245 |
| D | 0.144192 | −0.074910 | −0.082446 | −0.018645 | 0.007512 |
| E | −0.038063 | 0.031505 | 0.035005 | 0.004229 | −0.001938 |
| F | −0.006976 | −0.006213 | −0.008047 | −0.000541 | 0.000344 |
| G | 0.006837 | 0.000494 | 0.000948 | 0.000037 | −0.000039 |
| H | −0.001183 | −0.000006 | −0.000045 | −0.000001 | 0.000002 |
| J | 0 | 0 | 0 | 0 | −0.0000001 |

Figure 5:
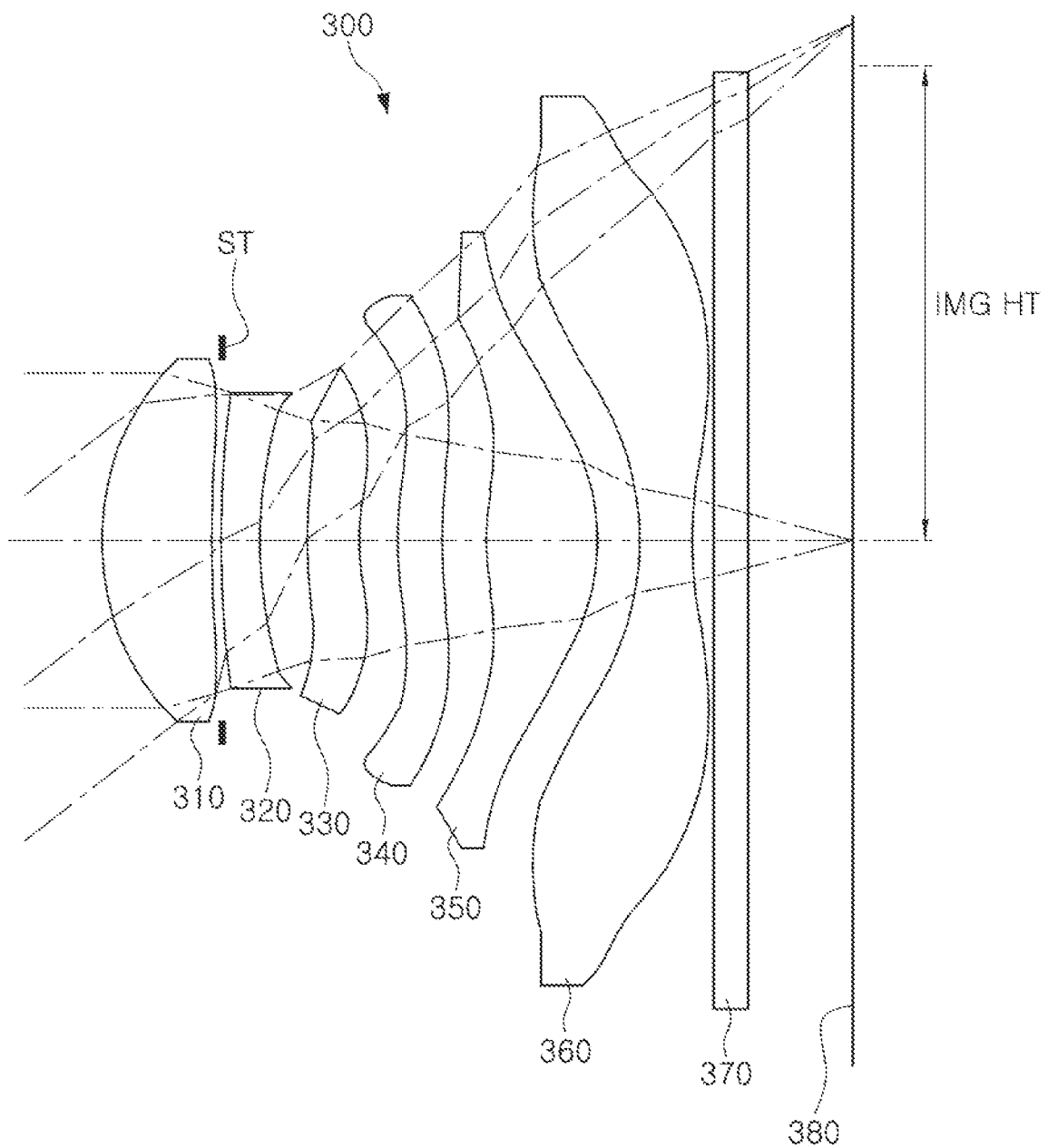
FIG. 5 is a view illustrating an example of an optical imaging system.

A third example of an optical imaging system will be described with reference to FIG. 5.

The optical imaging system 300 in the third example may include a plurality of lenses having refractive power. For example, the optical imaging system 300 may include a first lens 310, a second lens 320, a third lens 330, a fourth lens 340, a fifth lens 350, and a sixth lens 360.

The first lens 310 may have positive refractive power, and an object-side surface thereof may be convex and an image-side surface thereof may be concave.

The second lens 320 may have negative refractive power, and an object-side surface thereof may be convex and an image-side surface thereof may be concave.

The third lens 330 may have negative refractive power, and an object-side surface thereof may be convex and an image-side surface thereof may be concave.

The fourth lens 340 may have positive refractive power, and an object-side surface thereof may be convex and an image-side surface thereof may be concave. In addition, inflection points may be formed on the object-side surface and the image-side surface of the fourth lens 340. For example, the object-side surface of the fourth lens 340 may be convex in a paraxial region and be concave in an area near the paraxial region, and the image-side surface thereof may be concave in a paraxial region and be convex in an area near the paraxial region.

The fifth lens 350 may have positive refractive power, and an object-side surface thereof may be convex and an image-side surface thereof may be convex. In addition, inflection points may be formed on the object-side surface and the image-side surface of the fifth lens 350.

The sixth lens 360 may have negative refractive power, and an object-side surface thereof may be concave and an image-side surface thereof may be concave. In addition, inflection points may be formed on both surfaces of the sixth lens 360. For example, the object-side surface of the sixth lens 360 may be convex in a paraxial region and be concave in an area near the paraxial region, and the image-side surface thereof may be concave in a paraxial region and be convex in an area near the paraxial region.

The second lens 320 and the fourth lens 340 may each have relatively high refractive indices. The second lens 320 may have the highest refractive index among the lenses in the optical imaging system 300, and the fourth lens 340 may have the second highest refractive index among the lenses in the optical imaging system 300. The refractive index of the second lens 320 may be 1.66 or more, and the refractive index of the fourth lens 340 may be 1.6 or more. The first lens 310, the third lens 330, the fifth lens 350, and the sixth lens 360 may each have relatively low refractive indices. The refractive indices of the first lens 310, the third lens 330, the fifth lens 350, and the sixth lens 360 may each be 1.56 or less.

The second lens 320 and the fourth lens 340 may each have relatively low Abbe numbers. The Abbe numbers of the second lens 320 and the fourth lens 340 may each be 25 or less. The first lens 310, the third lens 330, the fifth lens 350, and the sixth lens 360 may each have relatively high Abbe numbers. The Abbe numbers of the first lens 310, the third lens 330, the fifth lens 350, and the sixth lens 360 may each be 52 or more.

The optical imaging system 300 may include a stop ST. For example, the stop ST may be disposed between the first lens 310 and the second lens 320. The stop ST may control an amount of light incident to an imaging plane 380.

The optical imaging system 300 may include a filter 370. For example, the filter 370 may be disposed between the sixth lens 360 and the imaging plane 380. The filter 370 may block an infrared ray incident to the imaging plane 380.

The optical imaging system 300 may include an image sensor. The image sensor may provide the imaging plane 380 on which light refracted through the lenses is imaged. The image sensor may convert an optical signal imaged on the imaging plane 380 into an electrical signal.

The optical imaging system 300 may have a low F No. The F No. of the optical imaging system in the third example 300 may be 1.85.

Figure 6:
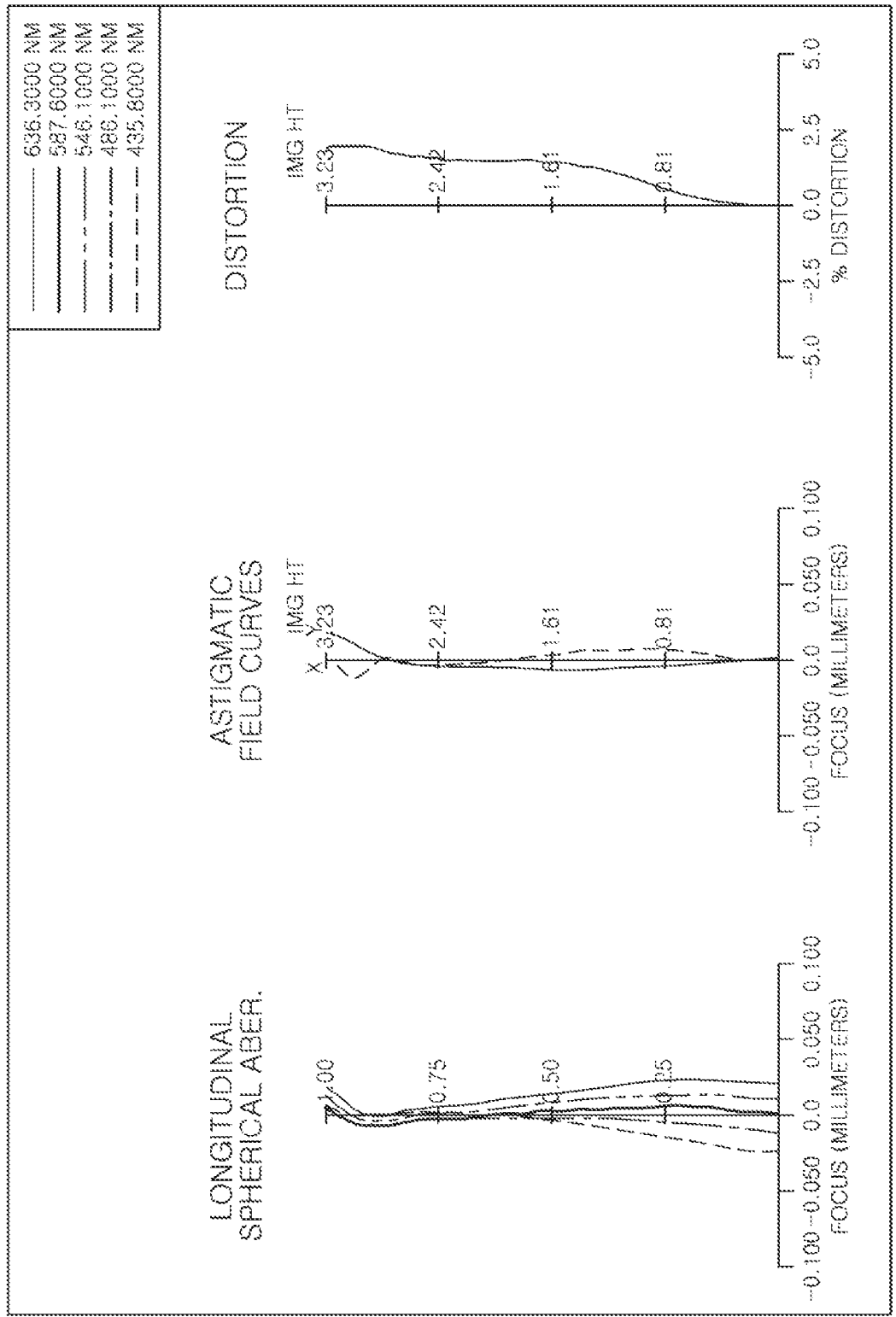
FIG. 6 illustrates graphs having curves representing aberration characteristics of the optical imaging system illustrated in FIG. 5.

The optical imaging system in the third example 300 may represent aberration characteristics as illustrated in FIG. 6. Table 5 represents characteristics of lenses of the optical imaging system in the third example 300, and Table 6 represents aspherical characteristics of the optical imaging system in the third example 300.

TABLE 5

Third Example
f = 3.93 F No. = 1.85 FOV = 77.7 OAL = 4.651

| Surface No. | | Radius of Curvature | Thickness/ Distance | Refractive Index | Abbe Number | Focal Length |
|---|---|---|---|---|---|---|
| S1 | First Lens | 1.5297 | 0.6936 | 1.544 | 56.100 | 3.423 |
| S2 | | 7.0440 | 0.0676 | | | |
| S3 | Second Lens | 6.1573 | 0.2200 | 1.660 | 20.350 | −7.910 |
| S4 | | 2.8045 | 0.3440 | | | |
| S5 | Third Lens | 15.2704 | 0.3263 | 1.544 | 56.100 | −60.697 |
| S6 | | 10.3777 | 0.1906 | | | |
| S7 | Fourth Lens | 2.7050 | 0.2643 | 1.640 | 23.500 | 42.832 |
| S8 | | 2.8830 | 0.3591 | | | |
| S9 | Fifth Lens | 136.3154 | 0.6051 | 1.544 | 56.100 | 2.018 |
| S10 | | −1.1101 | 0.2560 | | | |
| S11 | Sixth Lens | −1.5960 | 0.3300 | 1.535 | 55.700 | −1.690 |
| S12 | | 2.2531 | 0.1307 | | | |
| S13 | Filter | Infinity | 0.2100 | 1.517 | 64.200 | |
| S14 | | Infinity | 0.6540 | | | |
| S15 | Imaging Plane | infinity | | | | |

TABLE 6

| Third Exemplary Embodiment | S1 | S2 | S3 | S4 | S5 | S6 | S7 |
|---|---|---|---|---|---|---|---|
| K | −1.12419 | −23.70901 | 25.51264 | 4.39371 | 0.00000 | 0.00000 | −28.60705 |
| A | 0.035045 | −0.145295 | −0.224396 | −0.114403 | −0.128596 | −0.223970 | −0.125361 |
| B | 0.031409 | 0.282947 | 0.453658 | 0.273763 | 0.259451 | 0.478023 | 0.063239 |
| C | −0.107096 | −0.376518 | −0.509320 | −0.176649 | −1.405765 | −1.382746 | 0.028484 |
| D | 0.282541 | 0.376412 | 0.414946 | −0.456830 | 4.443413 | 2.718434 | −0.250774 |
| E | −0.447318 | −0.362563 | −0.460090 | 1.721506 | −9.267030 | −3.755079 | 0.393877 |
| F | 0.404893 | 0.291490 | 0.637465 | −2.600436 | 11.893505 | 3.335820 | −0.310794 |
| G | −0.196701 | −0.150222 | −0.502455 | 1.981063 | −8.639791 | −1.725537 | 0.118939 |
| H | 0.037687 | 0.034091 | 0.155741 | −0.570759 | 2.727763 | 0.399212 | −0.017004 |
| J | 0 | 0 | 0 | 0 | 0 | 0 | 0 |

| Third Exemplary Embodiment | S8 | S9 | S10 | S11 | S12 |
|---|---|---|---|---|---|
| K | −17.83478 | −64.15173 | −1.49159 | −9.97846 | −6.56149 |
| A | −0.150081 | −0.059463 | 0.204317 | −0.086943 | −0.138806 |
| B | 0.107785 | 0.013528 | 0.287397 | −0.063157 | 0.084164 |
| C | −0.071794 | −0.042805 | 0.244045 | 0.097511 | −0.042268 |
| D | −0.023610 | 0.059564 | −0.125089 | −0.044942 | 0.015340 |
| E | 0.081621 | −0.057366 | 0.042703 | 0.010812 | −0.003894 |
| F | −0.062110 | 0.029950 | −0.009650 | −0.001478 | 0.000659 |
| G | 0.021334 | −0.007338 | 0.001278 | 0.000109 | −0.000070 |
| H | −0.002799 | 0.000672 | −0.000073 | −0.000003 | 0.000004 |
| J | 0 | 0 | 0 | 0 | −0.0000001 |

Table 7 represents values of Conditional Expressions of the optical imaging systems in the first example 100, the second example 200, and the third example 300 described herein. As seen in Table 7, the optical imaging systems in the first example 100, the second example 200, and the third example 300 described herein satisfy all of numerical ranges of Conditional Expressions discussed herein.

TABLE 7

| Conditional Expression | First Example | Second Example | Third Example |
|---|---|---|---|
| f1/f2 | −0.4385 | −0.42956 | −0.43280 |
| V5 − V4 | 32.600 | 32.600 | 32.600 |
| OAL/FOV | 0.0587 | 0.0621 | 0.0599 |
| Th6/Th5 | 0.5776 | 0.5932 | 0.5453 |

As set forth above, in the embodiments disclosed herein, an optical imaging system appropriate for a small camera module having high performance may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens comprising positive refractive power;
   a second lens comprising negative refractive power, a convex object-side surface, and a concave image-side surface;
   a third lens comprising a convex object-side surface;
   a fourth lens comprising a convex object-side surface;
   a fifth lens comprising a convex image-side surface, and comprising a refractive power; and
   a sixth lens comprising a refractive power,
   wherein the first to sixth lenses are sequentially disposed in ascending numerical order from an object side of the optical imaging system toward an imaging plane of the optical imaging system,
   wherein an absolute value of a curvature of the object-side surface of the second lens is larger than an absolute value of a curvature of an image-side surface of the first lens,
   wherein an absolute value of a curvature of an image-side surface of the third lens is larger than an absolute value of a curvature of an object-side surface of the fourth lens,
   wherein a radius of curvature of an image-side surface of the second lens is greater than a radius of curvature of an image-side surface of the fourth lens, and
   wherein −0.7<f1/f2, where f1 is a focal length of the first lens and f2 is a focal length of the second lens.

2. The optical imaging system of claim 1, wherein the first lens has a convex object-side surface.

3. The optical imaging system of claim 1, wherein the first lens has a concave image-side surface.

4. The optical imaging system of claim 1, wherein the third lens has a concave image-side surface.

5. The optical imaging system of claim 1, wherein the fourth lens has a concave image-side surface.

6. The optical imaging system of claim 1, wherein the fifth lens has a convex object-side surface.

7. The optical imaging system of claim 1, wherein the sixth lens has a concave object-side surface.

8. The optical imaging system of claim 1, wherein the sixth lens has a convex image-side surface in an off-axial region.

9. The optical imaging system of claim 1, wherein the third lens has positive refractive power.

10. The optical imaging system of claim 1, wherein the fourth lens has negative refractive power.

11. The optical imaging system of claim 1, wherein the fifth lens has positive refractive power.

12. The optical imaging system of claim 1, wherein V4 is an Abbe number of the fourth lens, V5 is an Abbe number of the fifth lens, and V5-V4 is greater than 20 and less than 40.

13. The optical imaging system of claim 1, wherein an f-number of the optical imaging system is less than 2.0.

14. The optical imaging system of claim 1, wherein the sixth lens has a concave image-side surface in a paraxial region.

15. An optical imaging system comprising:
   a total of six lenses with refractive power, the six lenses including:
      a first lens comprising positive refractive power;
      a second lens comprising negative refractive power, a convex object-side surface, and a concave image-side surface;
      a third lens comprising positive refractive power, a convex object-side surface, and a concave image-side surface;
      a fourth lens comprising negative refractive power, and a convex object-side surface;
      a fifth lens comprising a refractive power and a convex image-side surface; and
      a sixth lens;
   wherein the first to sixth lenses are sequentially disposed in ascending numerical order from an object side of the optical imaging system toward an imaging plane of the optical imaging system,
   wherein an absolute value of a radius of curvature of the object-side surface of the second lens is greater than an absolute value of a radius of curvature of an image-side surface of the first lens, and
   −0.7<f1/f2, where f1 is a focal length of the first lens and f2 is a focal length of the second lens.

16. The optical imaging system of claim 15, wherein the sixth lens has a concave image-side surface in a paraxial region.

* * * * *